United States Patent
Lauder et al.

(10) Patent No.: US 8,351,297 B2
(45) Date of Patent: Jan. 8, 2013

(54) SYSTEMS AND METHODS OF AUTOMATED CORRELATION OF WEAPON FIRE DATA WITH MONITORED PERSONS-OF-INTEREST/LOCATION DATA

(75) Inventors: Gary Mark Lauder, Atherton, CA (US); Robert L. Showen, Los Altos, CA (US); James G. Beldock, San Francisco, CA (US); Peter C. Sarna, II, Clayton, CA (US)

(73) Assignee: Shotspotter, Inc., Mountain View, CA (US)

( * ) Notice: Subject to any disclaimer, the term of this patent is extended or adjusted under 35 U.S.C. 154(b) by 212 days.

(21) Appl. No.: 12/757,029

(22) Filed: Apr. 8, 2010

(65) Prior Publication Data

US 2011/0169633 A1  Jul. 14, 2011

Related U.S. Application Data (63) Continuation-in-part of application No. 11/973,310, filed on Oct. 5, 2007, now Pat. No. 7,855,935.

(60) Provisional application No. 60/850,237, filed on Oct. 5, 2006, provisional application No. 61/168,219, filed on Apr. 10, 2009.

(51) Int. Cl.
*G01S 3/80* (2006.01)
*G08B 1/08* (2006.01)

(52) U.S. Cl. ........................................ 367/128; 367/906
(58) Field of Classification Search .................. 367/128, 367/127, 906; 340/425.5, 539.13
See application file for complete search history.

(56) References Cited

U.S. PATENT DOCUMENTS

| | | | |
|---|---|---|---|
| 5,973,998 A | 10/1999 | Showen et al. | |
| 7,109,859 B2 | 9/2006 | Peeters | |
| 7,518,504 B2 | 4/2009 | Peeters | |
| 7,586,812 B2 | 9/2009 | Baxter et al. | |
| 7,796,470 B1 | 9/2010 | Lauder et al. | |
| 7,855,935 B1* | 12/2010 | Lauder et al. | 367/128 |
| 2002/0003470 A1 | 1/2002 | Auerbach | |
| 2006/0114749 A1* | 6/2006 | Baxter et al. | 367/128 |
| 2011/0169633 A1* | 7/2011 | Lauder et al. | 340/539.13 |

FOREIGN PATENT DOCUMENTS

WO  WO/2009/046367  * 4/2009

OTHER PUBLICATIONS

PCT International Search Report and Written Opinion dated Dec. 5, 2008 corresponding to the related PCT application PCT/US08/78840.

* cited by examiner

*Primary Examiner* — Daniel Pihulic
(74) *Attorney, Agent, or Firm* — DLA Piper LLP (US)

(57) ABSTRACT

Systems and methods are disclosed for processing information associated with monitoring persons/devices and weapon fire location information. In one exemplary implementation, a weapon fire location system is used to characterize and locate impulsive events and these locations are correlated with the positions of monitoring persons or devices, such as monitoring anklets placed on offenders or other persons of interest. Further, various information can be plotted on map, display, or for other graphical output to assist in the process of handling a weapon fire event. For example, when a monitoring device, whose position can be provided by GPS or alternate methods is found nearby a gunshot location, then associated graphical information can be presented on the output of the weapon fire location system or an associated display used by those monitoring the offenders.

49 Claims, 11 Drawing Sheets

SYSTEMS AND METHODS OF AUTOMATED CORRELATION OF WEAPON FIRE DATA WITH MONITORED PERSONS-OF-INTEREST/LOCATION DATA

CROSS REFERENCE TO RELATED APPLICATIONS

This is a continuation-in-part of application Ser. No. 11/973,310, filed Oct. 5, 2007, now U.S. Pat. No. 7,855,935, which claims benefit/priority to provisional patent application No. 60/850,237, filed Oct. 5, 2006, and this application also claims benefit/priority to U.S. provisional patent application No. 61/168,219, filed Apr. 10, 2009, all of which are incorporated herein by reference in entirety.

BACKGROUND

1. Field

The present invention relates generally to systems and methods associated with detection/location of weapon fire incidents including correlation with nearby monitoring device information.

2. Description of Related Information

Some gunshot location systems may use a network of dedicated acoustic sensors distributed throughout a region, e.g., on telephone poles or buildings. This type of system determines relative arrival times between sensors and triangulates locations of gunshot events, which may then be presented on a display to a user. Gunshot location systems such as this have been installed in a number of municipalities. They are useful in promoting public safety by providing fast notification of gunshot events to law enforcement officials. Even with immediate notification, however, it can take minutes for officials to arrive at the scene. By then, perpetrators may have fled and little evidence may remain to help officials identify them. In addition, victims and witnesses may no longer be present to assist officials with valuable information or evidence. There is thus still a need for more effective ways to process information and/or assist officials in responding to gunshot events.

In accordance with this disclosure, innovations associated with weapon fire or gunshot location systems are provided in association with monitoring devices, resulting in improvements to law enforcement efficiency and community safety.

SUMMARY

Systems, methods, and articles of manufacture consistent with the innovations herein are directed to processing information associated with weapon fire.

In one exemplary implementation, there is provided a method of processing information associated with weapon fire, including identifying a weapon fire incident, determining positional information regarding a location of the weapon fire, and processing positional information regarding a person/device of interest within a particular proximity of the location of the weapon fire. Moreover, exemplary methods may include providing information for displaying the positional information of the location of the weapon fire and the person/device together on a display. Other exemplary implementations may include performing processing that provides one or more of location of the weapon fire, device location information and/or other information related to the device for various uses.

It is to be understood that both the foregoing general description and the following detailed description are exemplary and explanatory only and are not restrictive of the innovations, as described. Further features and/or variations may be provided in addition to those set forth herein. For example, the present innovations may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and aspects of the present innovations and, together with the description, explain exemplary principles of the disclosure. In the drawings.

DETAILED DESCRIPTION OF EXEMPLARY IMPLEMENTATIONS

Reference will now be made in detail to the invention, examples of which are illustrated in the accompanying drawings. The implementations set forth in the following description do not represent all implementations consistent with the claimed innovations. Instead, they are merely some examples consistent with certain aspects related to the innovations herein. Wherever possible, the same reference numbers will be used throughout the drawings to refer to the same or like parts.

According to implementations of the innovations herein, a weapon fire location system (or, more specifically, a gunshot location system) may determine the locations of weapon fire, such as gunfire. According to exemplary aspects thereof, the locations of mobile electronic devices near to the gunfire may then obtained. For example, a system may obtain information about a cellular phone, whose location may be determined using E911 location information from cellular providers. Such exemplary gunshot location system may then present the gunshot location together with the mobile device locations on a single display, representation, map, etc. Further, such mobile device users may either be in danger from flying bullets or may be the perpetrators of the gunfire. In either event, law enforcement officials can know in real time the weapons locations and mobile device locations on a detailed map, including integration thereof with other location information such as aerial photography. Law enforcement officers can then respond immediately to assist or apprehend, or the mobile devices can be called to inquire if the user needs assistance. The dispersal or not of the mobile devices after the event may also indicate fleeing victims or suspects, or immobilized users. The owner identification from mobile device records will also assist in preventing felons on probation from engaging in weapon fire activities. Potential witnesses to a crime may also be identified and their testimony can be solicited.

Figure 1:
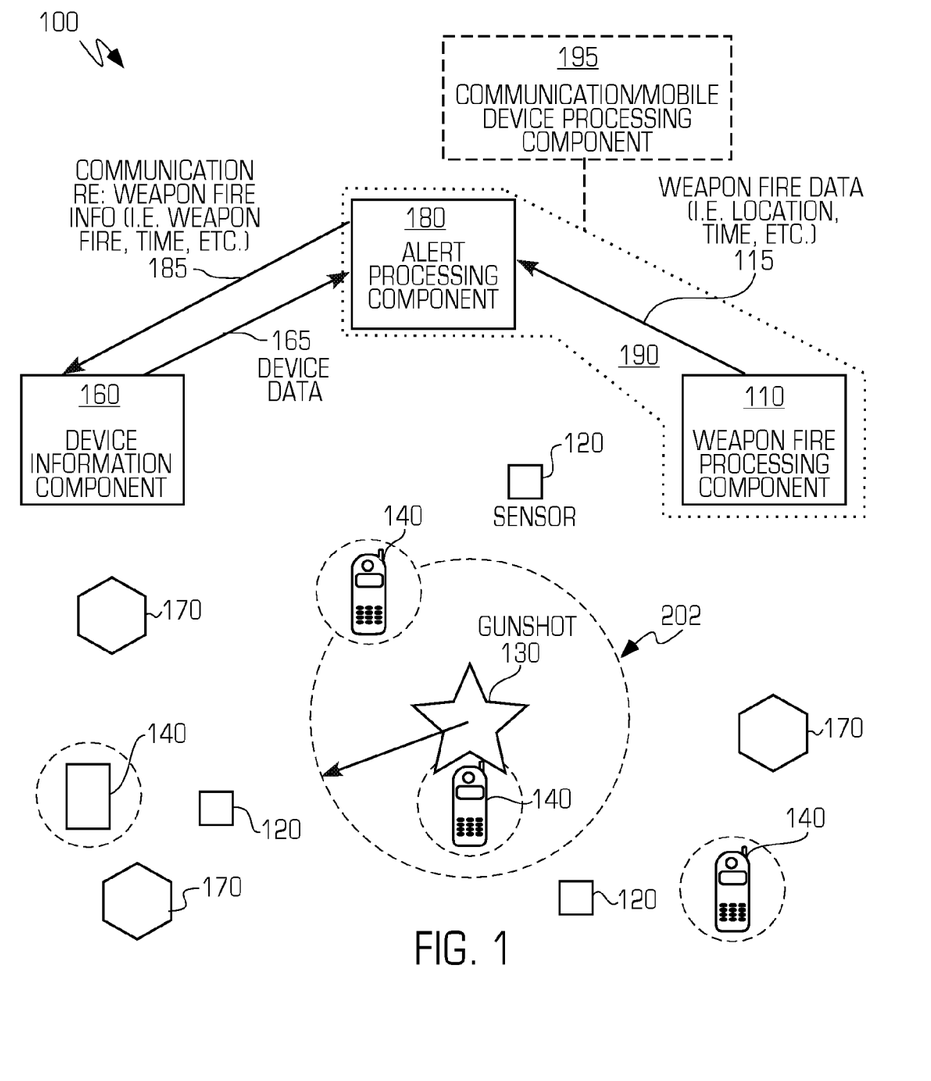
FIG. 1 is a block diagram of an exemplary system showing exemplary interactions between weapons firing processing component, an alert processing component, and a device information component consistent with certain aspects related to the innovations herein.

FIG. 1 illustrates an exemplary weapon fire location system 100 which may request mobile device information as set forth herein via available sources thereof, such as police, other law-enforcement or related, and other dispatch according to one exemplary implementation of the innovations herein. According to aspects of the implementations illustrated, upon reception of acoustic impulses from a gunshot by acoustic sensors 120, the gunshot location 130 may be determined by a weapon fire processing component 110. Weapon fire data 115 such as time and location of the gunshot may be passed to an alert processing component 180, such as a police dispatch computer (or other law enforcement computer). There, for example, a processing component or dispatch operator may validate the entity's interest in this event, and may send a communication 185 to a device information component 160 such as a telephone company computer including the location and time of the gunshot event. The device information component determines if there are any devices 140 such as mobile devices within a designated distance 202 of the gunshot at the time of the gunshot, and returns device-related data 165 to the alert processing component, which may then display the gunshot and device locations together on a detailed map. In a cellular phone implementation, cellular towers 170 may be used by the mobile device component 160 to determine cell phone locations. Further, it should be noted that, while the various components are illustrated as shown in FIG. 1 for the sake of explanation, other networked or distributed combinations of these components are within the scope of the present innovations. For example, the weapon fire processing component 110 may be integrated with the alert processing component 180, to form a unitary processing component 190.

Further, any of the functionality set forth herein may be implemented by various distributed or adjunct means, such as via an additional processing component 195 connected within the system 100. Other external processing components may also be accessed by the system, for example, to perform one or more of the processing steps or obtain various pieces of information described throughout. As such, the outputs of various computing components may be processed in combination to yield advantageous results and otherwise assist law enforcement in better providing for the community welfare. Innovations herein may include communicating with databases of this nature, such as databases containing one or more of government vehicle location information, blue force location information, automobile location information (Lo-Jack®, On-Star®), individual information related to elderly and/or young persons, medical information or information relating to humanitarian needs, etc., biographic information, website information, police information, terrorist information, person-location information, or any other various databases known to provide this or related information.

As described herein, a gunshot (or weapon fire) location system is a tool which presently permits law enforcement to respond quickly to an accurately located gunfire event. Additionally, several systems are available to determine location, ownership, movement and/or other aspects of mobile devices, such as cellular phones. As an example, the FCC has a requirement that cellular phones be locatable by the phone system operators to within 100 m of their actual position 67% of the time. This is known as an E911 (extended 9-1-1) requirement. This functionality is presently achieved in many areas, especially along arterial traffic routes. When a cellular phone is used to call 9-1-1, the dispatcher automatically knows the location of the caller. Thus the mobile phone is brought into the same locatable category as when a landline owner calls 9-1-1 and the name and address is presented automatically to the dispatcher, per governmental regulation. For certain mobile devices, E911 cannot be used. However, other location providing systems and methods, such as Broadband Network End-Point Locations (among others), may substitute or suffice.

According to one exemplary implementation, there is provided a method of processing information associated with weapon fire, including identifying a weapon fire incident, determining positional information regarding a source location of the weapon fire, and processing positional information regarding a device or devices within a particular proximity of the source location of the weapon fire. Such devices may include one or more of communications devices (land or mobile phones, PDAs, other RF devices, etc.), mobile devices, a location-providing device (GPS, tracking or monitoring device, etc.) and/or other devices set forth herein. Moreover, such exemplary methods may also include providing information for displaying the positional information of the source location of the weapon fire and the device together on a display. Some exemplary methods may also include acquiring information regarding the device or a person associated with the device (owner, etc.), and/or performing processing that provides the various information processed for transmission as well as display. Other exemplary implementations may include performing processing that provides one or more of source location of the weapon fire, device location information and/or other information related to the device for various uses.

Aspects of the innovation may also perform innovative processing related to or otherwise account for restriction regarding the various information sought. "In the United States, federal legislation considers location information from mobile devices to be customer network proprietary information (CPNI), and can only be released with prior customer authorization except for emergency situations." The law enforcement or military uses contemplated in these innovations should fall under and be permitted by the "emergency situation" exception. *The Development of Location Based*

*Services in Mobile Commerce*, Charles Steinfield Department of Telecommunication Michigan State University, Priessl, B., Bouwman, H. and Steinfield, C. (eds.), Elife after the dot.com bust, Berlin: Springer.

Information concerning mobile phone usage the conversations and the location—is usually held as privileged for the user alone. Governmental access to such information is normally not permitted, except when crimes are committed. One example of this exception is that court usage of mobile phone records may be granted to assist investigation and as evidence presented to a jury. Law enforcement also has the right to stop and inspect (i.e., pat-down) a person if they are considered a threat to the officer or other persons. A verifiable report of gunfire from a gunshot location system may give probable cause to interrogate and if appropriate inspect someone in the vicinity of the known shot. Likewise this doctrine of probable cause may enable law enforcement to automatically receive from a cellular phone provider the location and identification of mobile phones (just as is presently done when the mobile phones are used to call 9-1-1). According to some aspects of the innovations herein, a gunshot location system output may be employed as an 'electronic citizen' calling on behalf of people in the vicinity of the gunfire.

Figure 2:
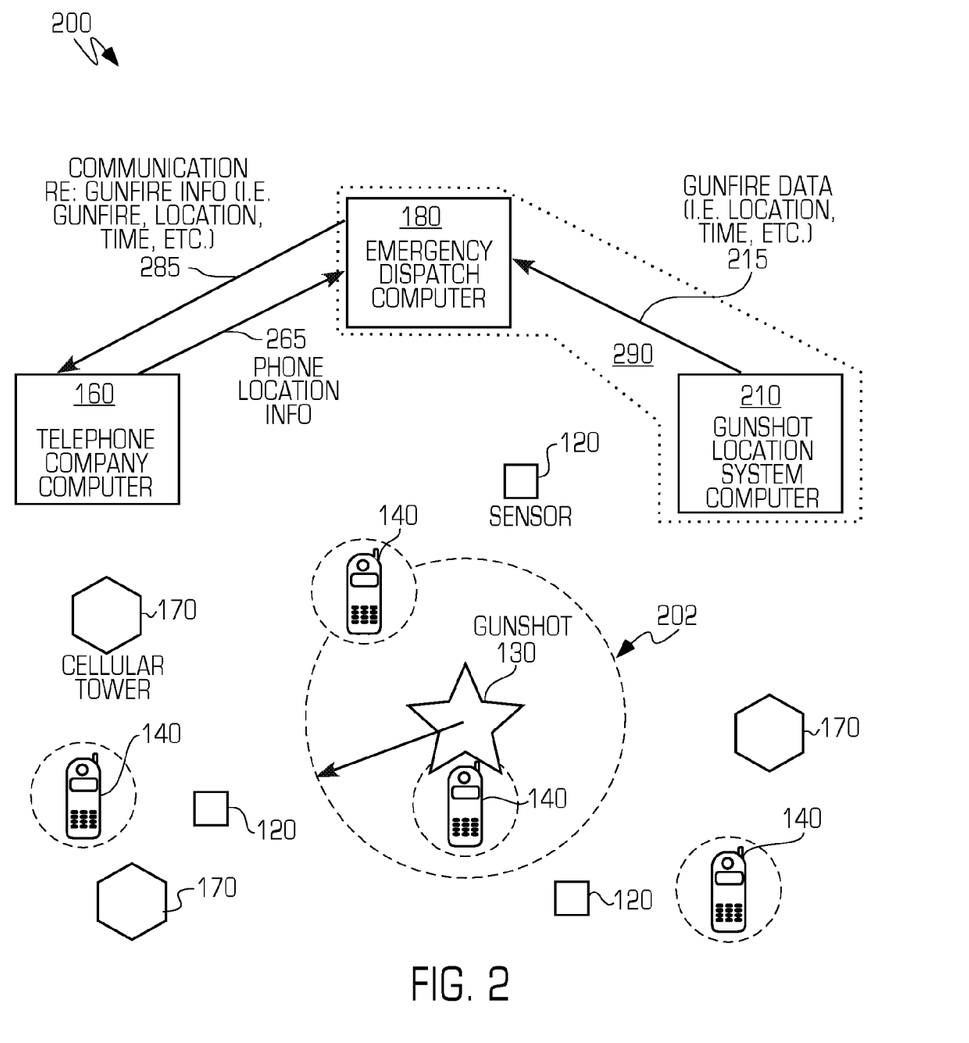
FIG. 2 is a block diagram illustrating exemplary aspects of a gunshot location system computer interacting with an emergency dispatch computer and a telephone company computer consistent with certain aspects related to the innovations herein.

FIG. 2 is a diagram illustrating an exemplary Gunshot Location System (GLS) 200 calling for cellular phone positions via emergency dispatch. Another exemplary gunshot location system is U.S. Pat. No. 5,973,998 entitled "Automatic Real-Time Gunshot Locator and Display System," which is incorporated herein by reference. In the exemplary system of FIG. 2, a Gunshot Location System computer 210 may provide gunfire data 215 such as location and time to an Emergency Dispatch Computer 280. This computer, either automatically or under manual control from a dispatcher, may request 285 and receive 265 information from a Telephone Company Computer 260 regarding cellular phones 140 located near a gunshot location 130. Various other distributed and combined computing systems 290 and information processing may be employed by the present systems, as set forth and claimed herein. During operational practice of exemplary gunshot locating systems, upon locating gunshot(s), the systems may be employed to sound an alarm and present a verifiable gunshot event to a computer screen. A dispatcher (or incident processing component) can then inspect the data, possibly listening to the shots, confirm that this event should be acted upon, and initiate a manual or computer-to-computer request to all mobile phone providers to instantly present mobile phone locations if they are within a designated distance of the gunfire. The designated distance may be within a specified area or surrounding, it may be a distance such as within about 300 meters, triple the expected error of the phone positions, or otherwise selected by practice as a function of the physics of the surroundings. This value can be adjusted as geography, topography and experience demand—for example, shrunk in heavily urbanized areas if too many mobile devices are detected within a designated distance. In certain circumstances, the specified proximity would not be defined by a distance but a region, such as in a building, a train, a ship, etc. According to other exemplary systems, for example, the error in locating urban gunfire is likely to be significantly less than the exemplary 300 meters distance listed above.

Additional aspects of the innovations herein may include further processing steps related to transmission and receipt related to or other acquisition of information about nearby devices and/or their owners or users. For example, upon receipt of weapon fire location information, a processing component may transmit to a device processing component a request for specified information including one or both of location of mobile devices and/or identity of mobile device owners within the specified proximity. Determinations regarding whether incidents are authentic events, such as actual weapon fire events may also be included, as well. For example, such processing components, upon receipt of an authenticated weapon fire incident, may transmit to a mobile device processing component a request for specified information including one or both of location of mobile devices and/or identity of mobile device owners within the specified proximity. Further, processing components may also process instructions regarding provision of information for enabling a dispatcher to manually call a mobile device provider to provide weapon fire information and request location and identity information associated with mobile devices and/or their owners within a particular proximity of the weapon fire. Such innovation allow for more efficient and effective processing routines to address important response to identified incidents, whether such response is fully or partially automated.

According to these and other exemplary features, responding officers will know not only the gunfire locations, but the names and potentially other information about nearby device users. The dispatchers can also notice movement of the mobile devices before and after the event. Based upon such innovative provisioning of information, the dispatchers might in fact decide to call the mobile phones to inquire if the users need assistance or to ask if they can provide an eyewitness account of the incident. Semi-automated call-back equipment already exists to assist with a rapid call back.

While mobile devices such as cellular phones are frequently addressed herein, other devices and particularly other mobile device are consistent with the innovations herein, including, for example, suitable communicating, location-providing or localized-ownership-providing devices, as well as ankle-constrainment devices used by law enforcement, correctional institutions, or the courts, PDA devices having GPS or other location determination method who broadcast their positions to particular external entities, such as Wi-Fi, Wi-max, EVDO, etc., vehicle location devices such as LO-JACK® or ON-STAR®, mobile medical devices which transmit via RF or otherwise give alerts to crises and provide locations to medical personnel, government vehicle location information, "Blue Force" tracking units which update location of soldiers, vehicles, squad cars for command centers, active RFID devices with suitable range capabilities, as well as any other mobile device carried by people or vehicles which communicate their position.

Figure 3:
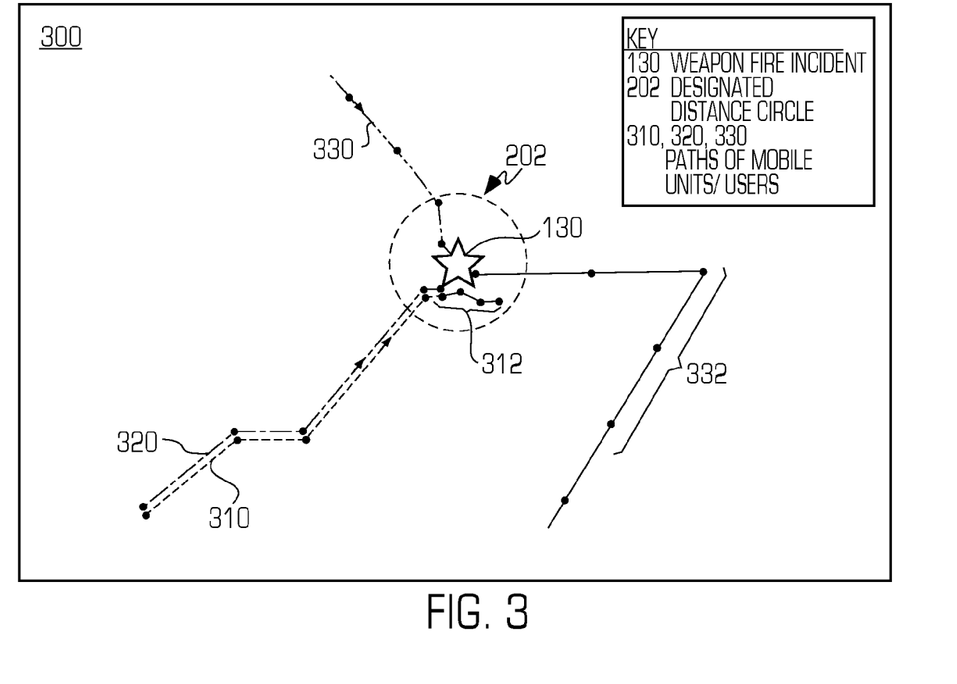
FIG. 3 is a diagram illustrating exemplary mobile device trajectories intersecting near a gunshot location, which can be used for real-time situation display of an evolving gunfire incident consistent with certain aspects related to the innovations herein.

FIG. 3 is a diagram illustrating exemplary mobile device trajectories intersecting near a gunshot location, which can be used for real-time situation display of an evolving gunfire incident consistent with certain aspects related to the innovations herein. A corresponding display may illustrate representative information available from such features, and may include mobile device owner activity of interest to the shooting. For example, exemplary display 300 shows device user trajectories passing within a designated distance 202 of a gunfire event 130. Users of the three phones as plotted 310, 320 and 330) are walking, as indicated by their progress points and velocity, here perhaps between 2 and 3 MPH. Note that device users 310 and 320 are walking together until the gunfire event, whereupon one stops suddenly, another slows down and then stops. In this example, then, they might initially or reasonably be considered victims. The third mobile device user 330 leaves the vicinity of the weapon fire after the incident and might be highlighted as a potential perpetrator or witness. Further his exact location, and exit route may be known and transmitted to authorities. Similarly, if the 'after firing' travel path of the second mobile device user 322 is minimal or stops completely, he or she may be viewed as a possible victim of the weapon fire, and/or also as a witness. Further other activity of interest, such as the travel path of the first mobile device user after the incident 312 may also be processed and analyzed to provide other important information about the incident or that user's involvement/witness thereof.

Further, a weapon fire processing component or other related or distributed processing components may perform various processes to provide this graphical information. For example, such processing components may provide motion data regarding movement of a mobile device after the weapon fire, wherein the motion data is provided for transmission in a manner suitable for graphical representation on a display, or they may provide motion data regarding movement of a mobile device before the weapon fire, wherein the motion data is provided for transmission in a manner suitable for graphical representation on a display. Further, they may provide motion data regarding movement of a mobile device before the weapon fire, wherein the motion data is provided for transmission in a manner suitable for graphical representation on a display.

Figure 4:
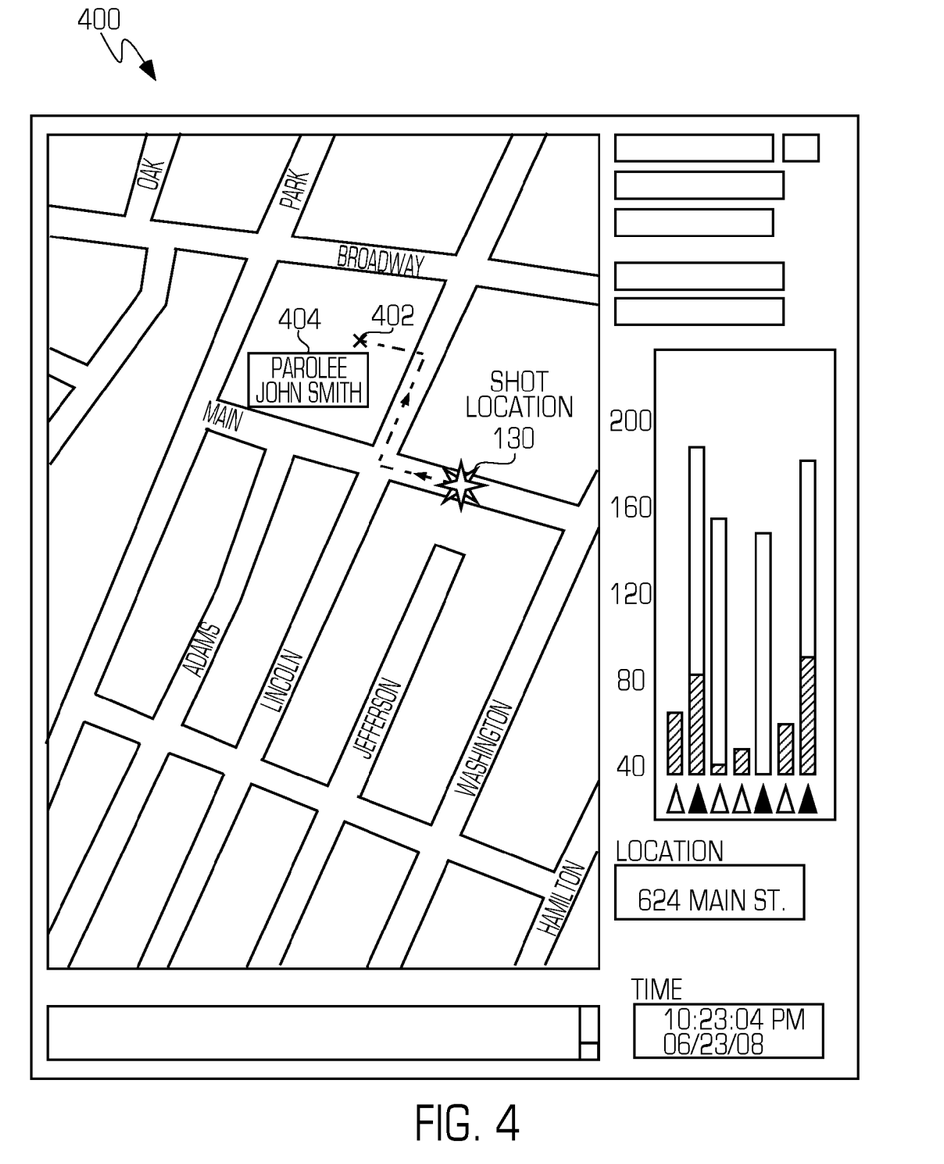
FIG. 4 is an exemplary graphical representation showing display of weapon fire location, device location and other exemplary information derived from the device consistent with certain aspects related to the innovations herein.

FIG. 4 is an exemplary graphical representation showing display of weapon fire location, device location and other exemplary information derived from the device consistent with certain aspects related to the present innovations. As shown in the exemplary display 400 of FIG. 4, if there is or are 'persons of interest' who law enforcement officials already have the right to surveil, then these individuals could be tracked on the same map as is covered by the gunshot location system (e.g., felons, parolees, ankle-constrained detainees). FIG. 4 illustrates an exemplary display 400 showing a weapon fire incident 130, as well as a location and/or travel path of a mobile device 402 and information associated with an owner of the mobile device 404. Thus, if such person of interest they were in the vicinity of a gunshot, their presence would be known. Likewise, friendly resources (the blue forces) could be tracked and then called into action if a nearby event occurred.

With regard to persons of interest within the vicinity of weapon fire events, further innovations and implementations exist. In particular, real-time gunshot location data may be correlated with location data of monitored offenders, such as GPS location data. As set forth in more detail below, automated software processing can compare gunshot location data to the location of monitored offenders to potentially identify suspects, accomplices, and witnesses and afford the ability to quickly locate these persons immediately after a shooting has occurred. Here, for example, data associated with monitoring and tracking devices, such as GPS devices, is obtained and processed in real time. Persons of interest may be violent criminals, parolees, probationers, sex offenders, gang members, drug traffickers, and other types of offenders.

In one exemplary implementation, a weapon fire location system is used to characterize and locate impulsive events (weapon fire, etc.) and these locations are correlated with the positions of monitored persons or monitoring devices, such as a monitoring anklet placed on offenders or other persons of interest. Further, various information may be obtained and processed for plotting on maps, displays, or generated for other graphical output to assist in the process of handling a weapon fire event. In one representative implementation, when a monitoring device (whose position can be provided by GPS or alternate methods) is found near a gunshot location, then various associated graphical information may be processed and/or presented for output, e.g., output on the weapon fire location system or on associated displays. Associated displays may be, for example, displays utilized by entities responsible for monitoring such offenders. Additionally, the motions of the offenders can be plotted on a map before and after the gunfire event to assist in situational awareness concerning the gunfire and possible perpetrators or victims.

Figure 5A:
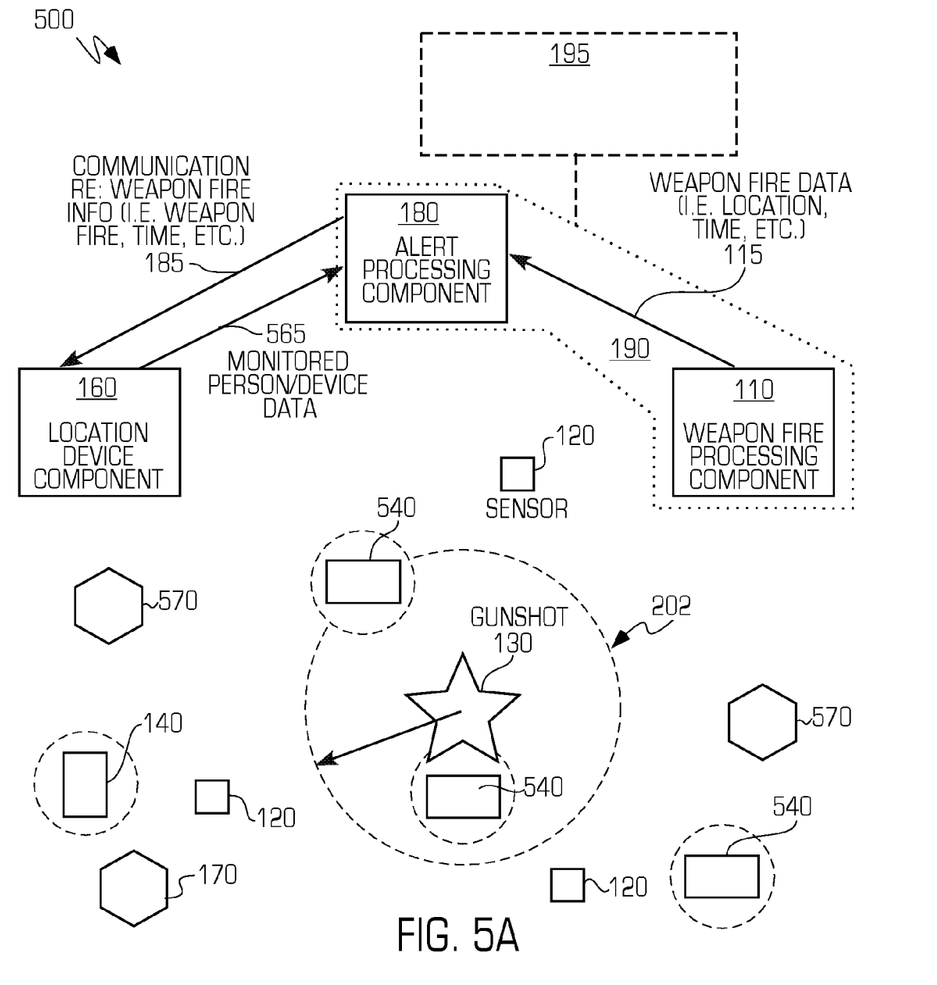
FIG. 5A is a block diagram of an exemplary system showing interactions between weapons firing processing component, an alert processing component, and a device/location-related component.

FIG. 5A illustrates an exemplary weapon fire location system 501 that may be used to perform the processing associated with such persons of interest. Similar to FIGS. 1 and 2, the system of FIG. 5A may process location/device information as set forth herein obtain from available sources, such as police, law-enforcement or law-enforcement related sources and/or other dispatch, according to one exemplary implementation of the innovations herein. As with the implementations of FIGS. 1 and 2, upon reception of acoustic impulses from a gunshot by acoustic sensors 120, the gunshot location 130 may be determined by a weapon fire processing component 110. Weapon fire data 115 such as time and location of the gunshot may be passed to an alert processing component 180, such as a police dispatch computer, other law enforcement computers, etc. There, for example, a processing component or dispatch operator may validate the entity's interest in this event, and may send a communication 185 to a location/device component 560, such as a computer associated with tracking monitored persons. The location/device component 560 may then determine if there are any monitored persons or associated devices 540 such as a parolee with an ankle bracelet within a designated distance 202 of the gunshot at the time of the gunshot, and returns monitored-person- or monitored-device related data 565 to the alert processing component, which may then display the gunshot and device locations together on a detailed map. In some implementations, location determining elements 570, such as GPS, at-home monitoring components, etc., may be used to determine desired location information. Further, it should be noted that, while the various components are illustrated as shown in FIG. 5A for ease of explanation, other networked or distributed combinations of these components are within the scope of the present innovations. For example, the weapon fire processing component 110 may be integrated with the alert processing component 180, to form a unitary processing component 190.

Figure 5B:
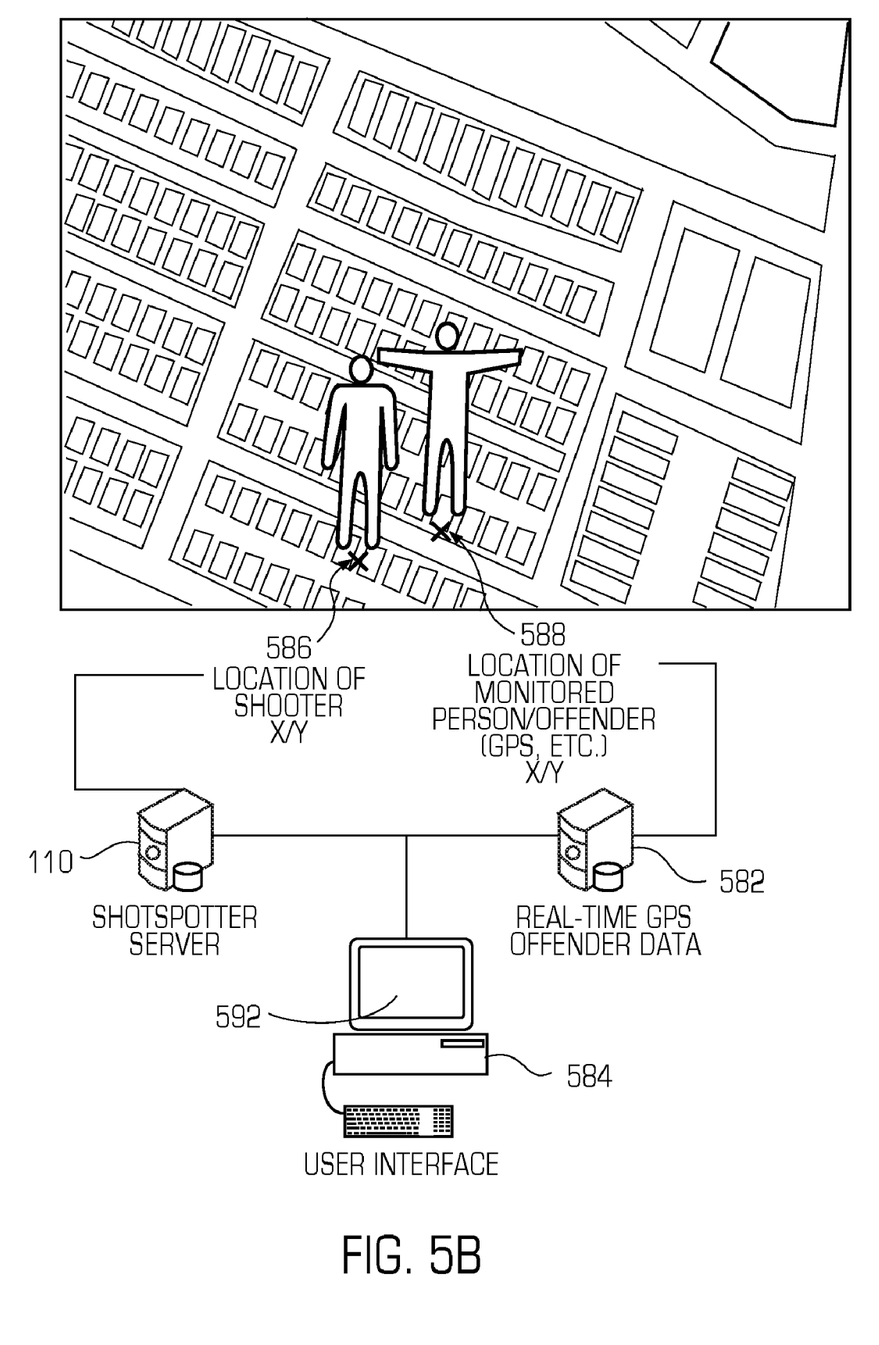
FIG. 5B is another block diagram showing exemplary components and features that may be associated with the exemplary system of FIG. 5A, consistent with certain aspects related to the innovations herein.

FIG. 5B is a simplified diagram showing the correlation of outputs between a gunshot location system computer 110, here labeled "ShotSpotter Server," and a Monitored Offender computer 528, here labeled "Real-Time GPS Offender Data." Relevant data from such computers are processed in accordance with the innovations herein to determine useful information and/or generate desired output, such as data that provides graphical output information showing combined location data from the shooter location 586 and the offender location 585 on a monitor, display or other suitable computer processing component 584. Such monitors, displays, or computer processing components 584 may include a screen 592 to display, e.g., a map or other graphical output as shown by way of example in FIG. 5C.

Figure 5C:
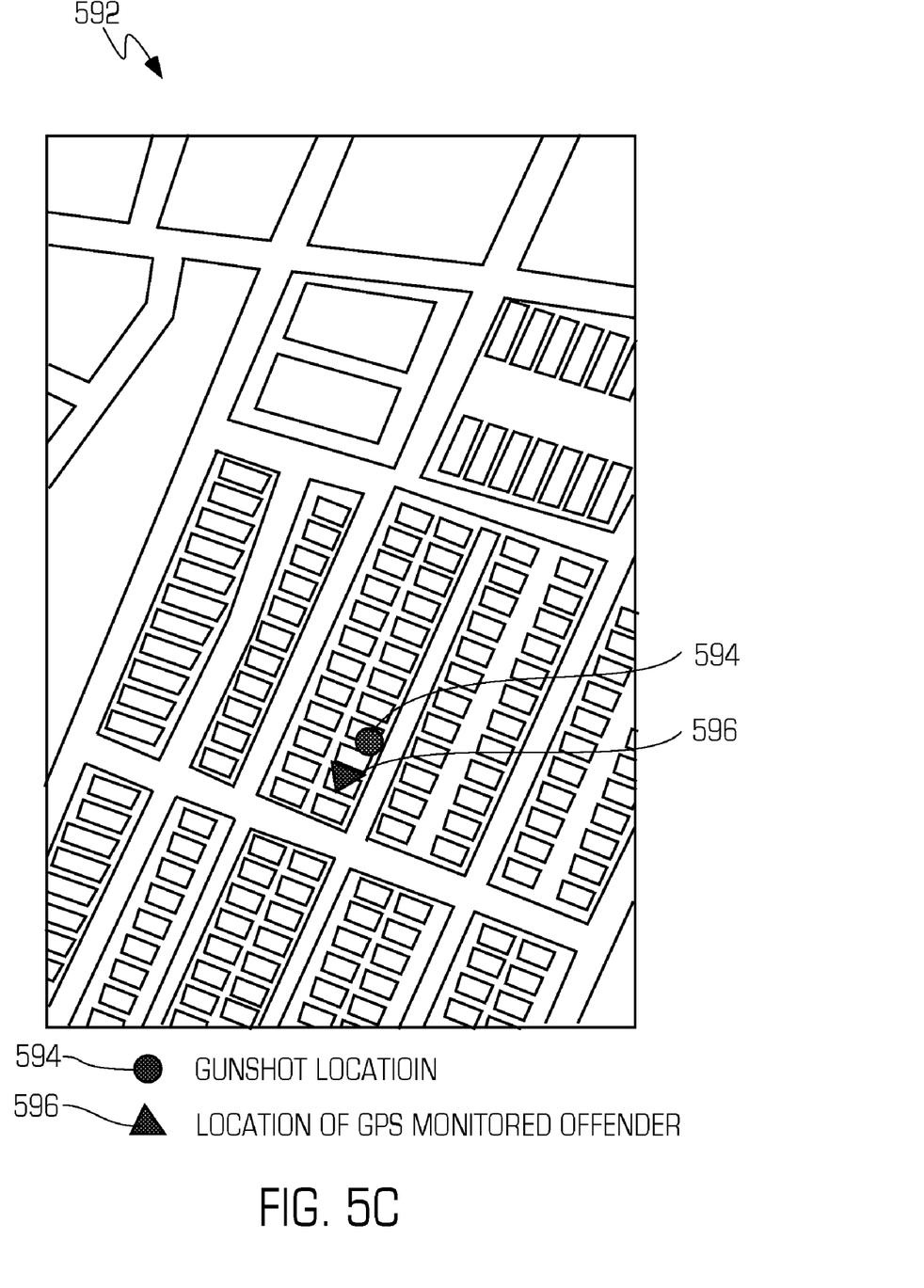
FIG. 5C is a graphical representation showing display of weapon fire location and location/monitored person information.

FIG. 5C illustrates an exemplary output of the combined systems as portrayed in FIG. 5B. Here, for example, a map or graphical representation may be presented of the region surrounding the detected event, including depiction of the event (gunshot location 594, etc.) and the monitored offender location 596. Law enforcement dispatchers may use this type of output to be aware of possible links between the shooting and the offender (or other monitored persons-of-interest). They can then take appropriate immediate action or save this data for possible later use in their crime solving activities.

Figure 6A:
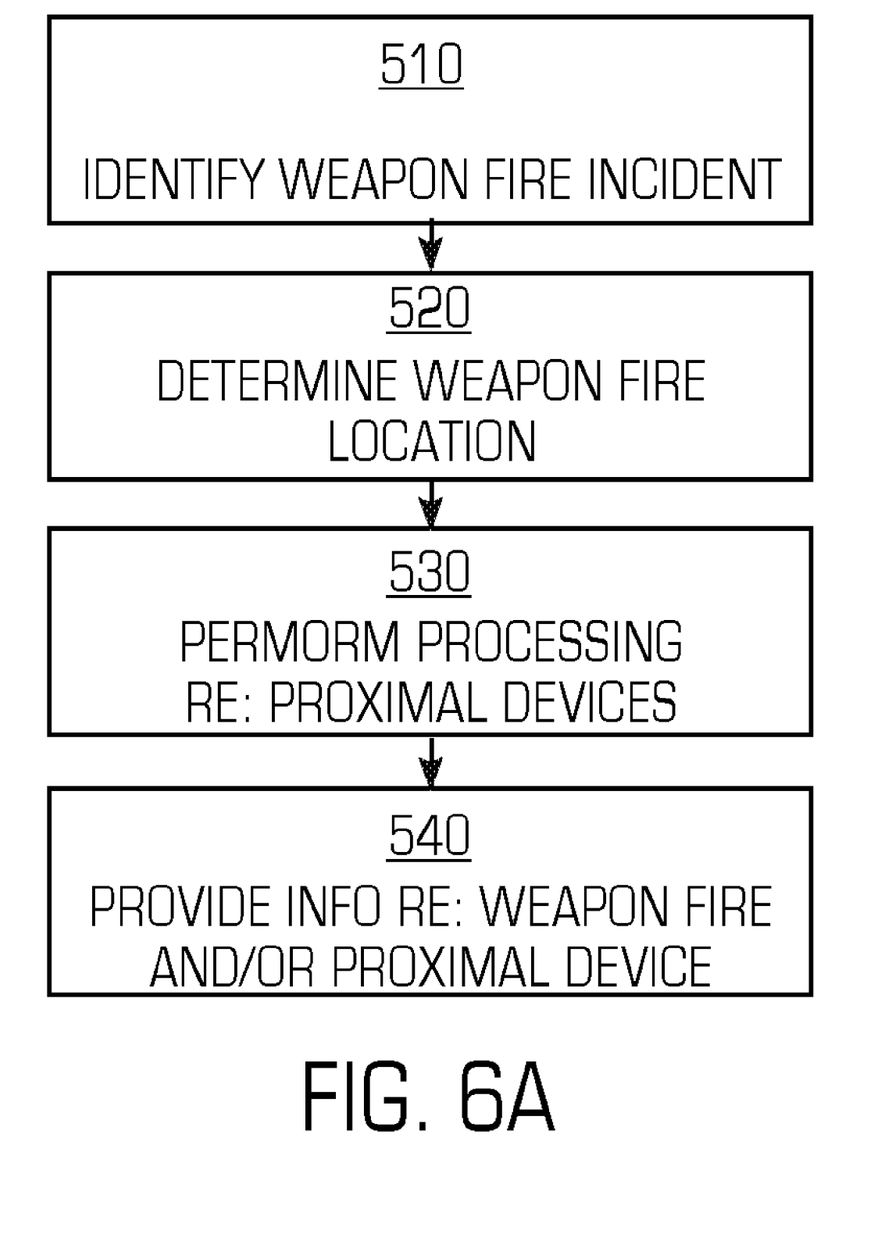
FIG. 6A is a flow chart illustrating an exemplary weapon fire processing method consistent with certain aspects related to the innovations herein.

Turning back to the weapon fire and mobile device implementations, FIG. 6A is a flow chart illustrating an exemplary weapon fire processing method consistent with certain aspects related to the innovations herein. The process of FIG. 6A diagram one exemplary method of processing that may be undertaken from initial gunshots to final use of information, by computer systems, dispatchers, officers, etc. Similar methodologies to this and the processes below may be implemented in military scenarios, where the dispatch computers are replaced by operational command center computers and the officers are replaced by soldiers on foot or in vehicles. Turning back to this example, there is provided a method of processing information associated with weapon fire, including identifying a weapon fire incident 510, determining positional information regarding a source location of the weapon fire 520, and processing positional information regarding a device or devices within a particular proximity of the source location of the weapon fire 530. Moreover, such exemplary methods may also include providing information regarding weapon fire and/or proximal devices 540. Other exemplary implementations may include initiating access to additional information regarding a mobile/communication device, receiving data regarding a person associated with the mobile/communication device, providing information for displaying the positional information of the source location of the weapon fire, the positional information of the mobile/communication device, and the received data together on a display.

Figure 6B:
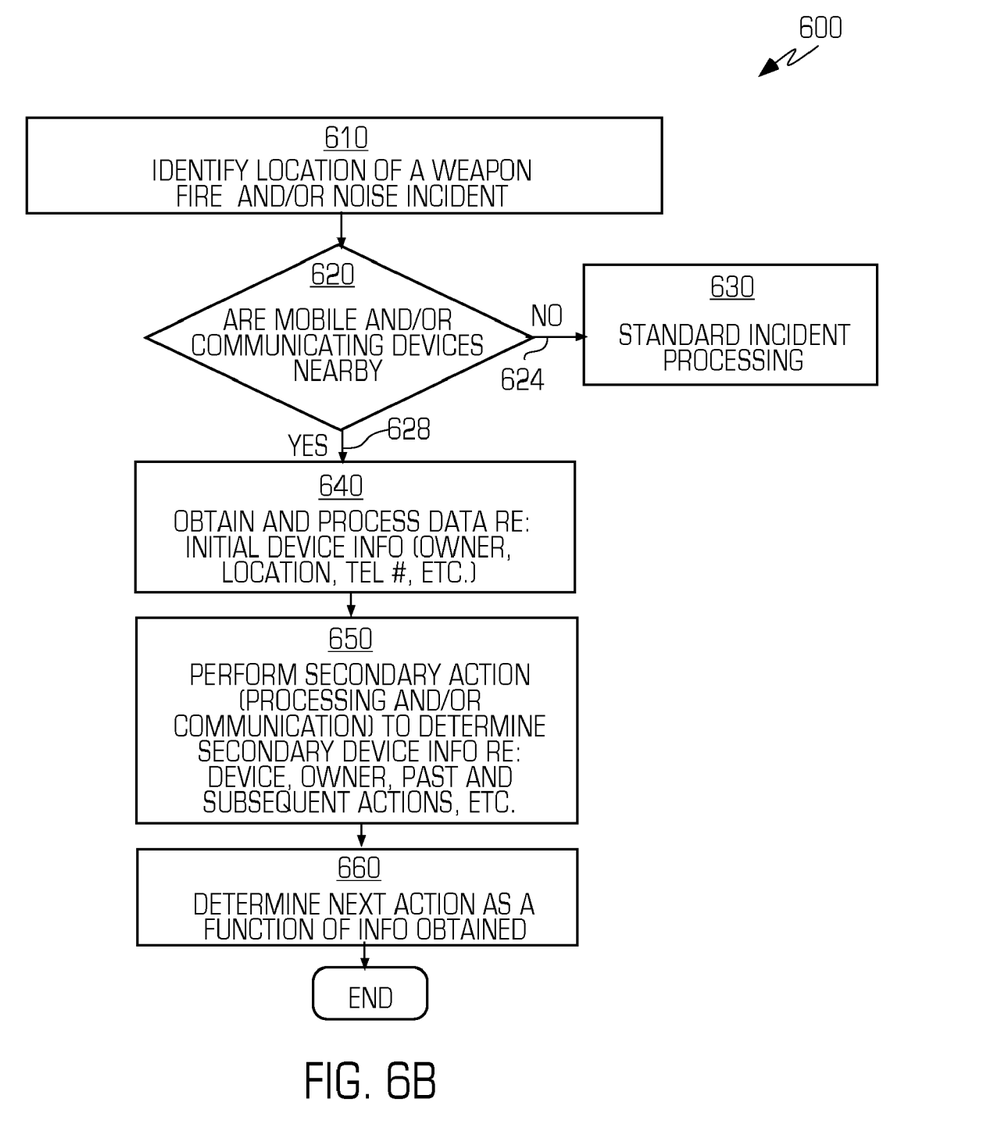
FIG. 6B is a flow chart illustrating an exemplary weapon fire and/or noise incident processing method consistent with certain aspects related to the innovations herein.

FIG. 6B is a flow chart illustrating an exemplary weapon fire and/or noise incident processing method consistent with certain aspects related to the innovations herein. In this exemplary process 600, a weapon fire and/or noise incident is first identified 610. Then, processors or operators may inquire of databases or processing centers to determine if mobile devices are nearby 620. If not 624, then the standard incident processing would be undertaken 630. If so 628, then augmented operations would be initiated. For example, the system or method may obtain and/or process data regarding initial device information 640. With this knowledge in hand, the systems or methods may then perform one or more secondary actions to determine secondary information about the device, owner, past or subsequent actions, etc. 650. Finally, appropriate subsequent action would then be determined 660 based on all of the various pieces of information obtained, the needs of the surrounding community, etc.

Figure 7:
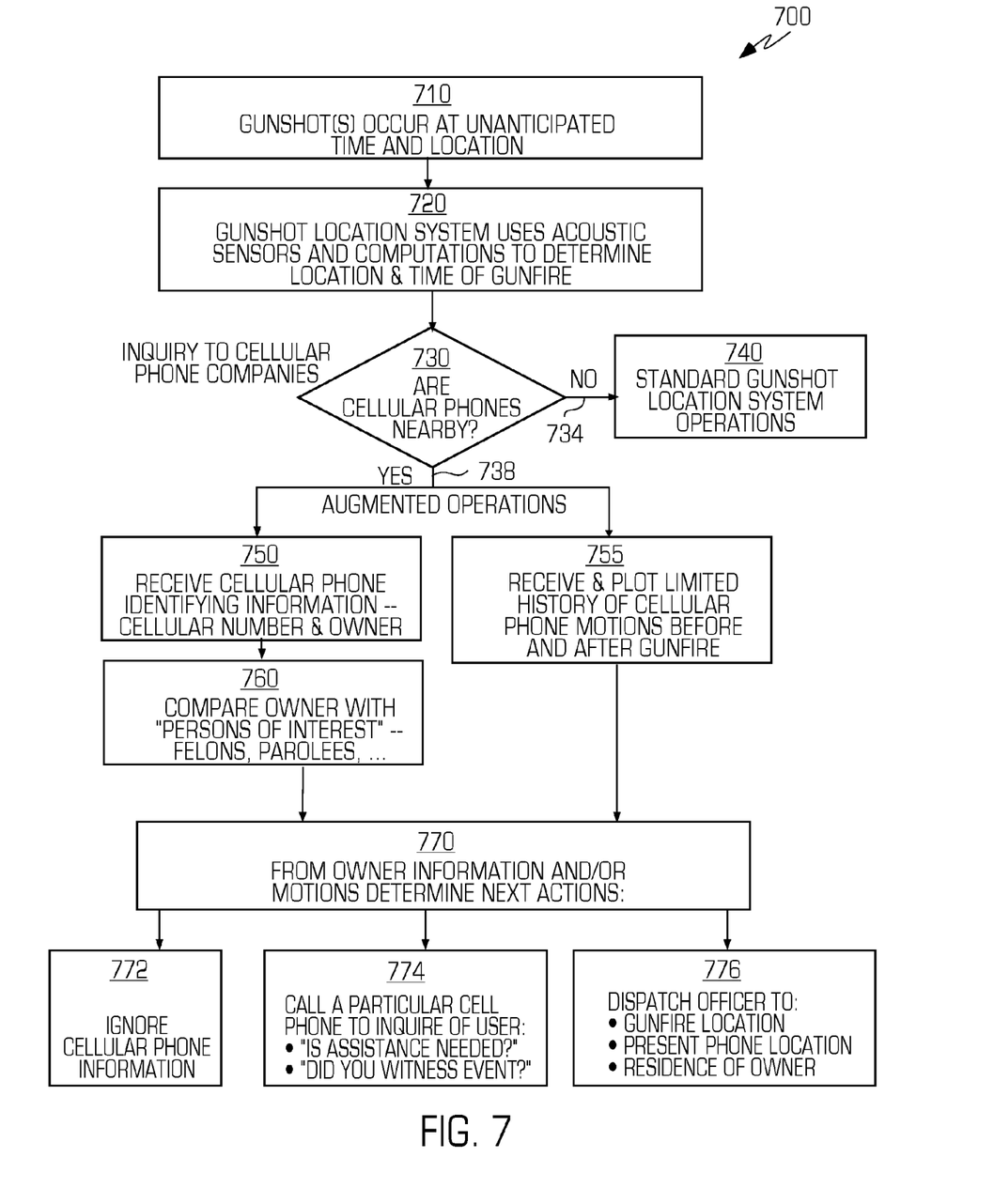
FIG. 7 is a flow chart illustrating an exemplary weapon fire processing method consistent with certain aspects related to the innovations herein.

According to another example, after weapon fire is detected and located 710, 720, FIG. 7 shows further steps relating to additional exemplary processing. First, processors or operators may inquire of cellular phone operating companies if any cellular phones were nearby 730. If not 734, then the standard gunshot responses would be undertaken 740. If so 738, then augmented operations would be initiated, having two additional information sets—(1) cellular phone identifying information 750 (principally phone numbers and owner names), and (2) a history of cellular phone motions before and after the gunfire 755. The information under (1) would be compared with lists of "persons of interest" 760 such as felons or parolees, and the information under (2) would be plotted on a map (see FIG. 4 for more details of such a mapping). From a combination and consideration of these two sets 770, the processing component or dispatcher might plausibly undertake one of the following three types of actions: (a) Ignore the cellular phone information 772, (b) call a particular phone 774 to inquire of user "is assistance needed?" and/or "did you just witness an event?", and/or (c) transmit instructions or dispatch 776 officers to either the gunfire location, the present location of a cellular phone, or the residence of a cellular phone owner.

Figure 8:
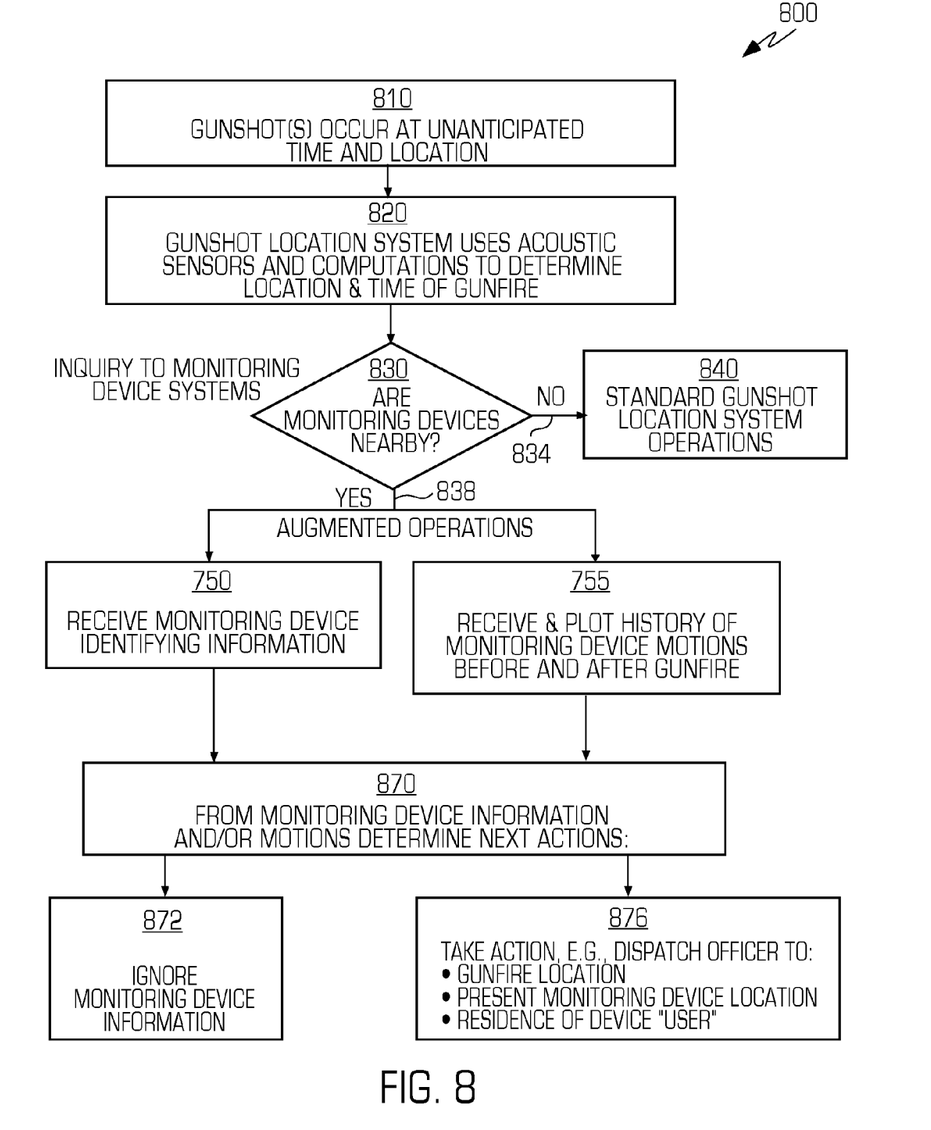
FIG. 8 is a flow chart illustrating an exemplary weapon fire processing method consistent with certain aspects related to the innovations herein.

FIG. 8 is flowchart similar to FIG. 7 illustrating exemplary processes specifically relating to monitored offenders or other persons-of-interest. Weapons fire occurs 810 and is located 820, then processors or operators may inquire of monitoring device systems if any monitoring devices were nearby 830. If not 834, then the standard gunshot responses would be undertaken 840. If so 838, then augmented operations would be initiated, having two additional information sets—(1) monitoring device identifying information 850 (principally "user" names and status as a "person of interest"), and (2) a history of monitoring device motions before and after the gunfire 855. The device motions would be plotted on a map (see FIG. 4 or 5C for exemplary illustrations of such a mapping). From a combination and consideration of these two sets 870, the processing component or dispatcher might plausibly either ignore the monitoring device information 872 or dispatch 876 officers to either the gunfire location, the present location of a monitoring device, or the residence of a monitoring device "user". In those occasions where the monitoring device has a receiver function, the dispatcher might also inquire of the "user" their circumstances.

Various other features are included within the scope of the innovations herein. For example, if a 9-1-1 call arrives, via any of cellular, land or other telephony communication, and the caller is near a recent gunshot location, then that call can be prioritized higher if it is waiting in a queue. Similarly, if a 9-1-1 call arrives, again via any of cellular, land or other telephony communication, and the caller is near a recent gunshot location, a presumption can be made that it should be routed to a nearby police force and not to a more distant jurisdiction. Further, the phone and/or gunshot locations can be presented to mobile law enforcement devices in, for example, government or official vehicles, such as police cars, ambulances, etc. If a casing, shell, or bullet is found at the site of gunfire, they can be entered into the national databases to correlate with known weapons. A cross check with registered gun owners may reveal if their cellular phone was present at or near the scene of a shooting, and their weapon tested (if not previously tested) to compare with the evidence at the shooting.

In the military realm, mobile or cellular phones are used for communication and for operations, offering the possibility that enemy usage can be countered. For example, a military dispatcher could intercept messages near weapons or explosions. If a cell phone was used to detonate an improvised explosive device (IED), its information just prior to the explosion could be known, as well as the phone which was calling it. Then the location and identify of the controlling phone could be known and appropriate action taken. Additionally, the prior history of the controlling phone might lead to knowledge of co-located phones which might be threats. Also, the code to control the IEDs might be discerned and that code could be sent to trigger explosions before the bombs were intentionally set off, possibly in the factory or on the route to deployment. A strategy could be implemented of pre-positioning GLS sensors to catch the expected sounds of explosions in concert with sending the code.

As disclosed herein, embodiments and features of the innovations herein may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present innovations may be implemented with any combination of hardware, software and/or firmware. Moreover, the above-noted features and other aspects and principles of the present innovations may be implemented in various environments. Such environments and related applications may be specially constructed for performing the various processes and operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the innovations, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the inventions herein, which are defined by the scope of the appended claims. Other embodiments are within the scope of the following claims.

The invention claimed is:

1. A method for processing information associated with weapon fire, the method comprising:
identifying a weapon fire incident;
determining a source location of the weapon fire;
processing positional information associated with a monitoring person or a monitored device within a particular proximity of the source location of the weapon fire;
processing display information for displaying both the location of the weapon fire and the monitoring device on a display; and
processing and/or providing motion data regarding movement of a mobile device before the weapon fire, wherein the motion data is provided for transmission in a manner suitable for graphical representation on a display.

2. The method of claim 1 wherein the location of the monitoring device is obtained from a GPS location.

3. The method of claim 2 wherein the monitoring device is associated with or attached to a person of interest.

4. The method of claim 3 wherein the person of interest is an offender or a felon.

5. The method of claim 1 wherein the monitoring device location is obtained from a system associated with locating the device, wherein a related location determining process may use location-specific or perimeter intrusion methods.

6. The method of claim 5 wherein the monitoring device is with or attached to a person of interest such as an offender or felon.

7. The method of claim 1 wherein the device is a mobile phone, a cell phone, a Wi-fi device, or a land phone.

8. The method of claim 1 further comprising:
processing information related to enabling a computer or dispatcher to send a message to a device within a particular proximity of the weapon fire.

9. The method of claim 1 further comprising:
processing output information including weapon fire data and mobile device data configured to enable graphical representation of weapon fire location and device location on the display.

10. The method of claim 1 further comprising:
processing and/or providing motion data regarding movement of a mobile device after the weapon fire, wherein the motion data is provided for transmission in a manner suitable for graphical representation on a display.

11. A method for processing information associated with weapon fire, the method comprising:
identifying a weapon fire incident;
determining a source location of the weapon fire;
processing positional information associated with a monitoring person or a monitored device within a particular proximity of the source location of the weapon fire;
processing display information for displaying both the location of the weapon fire and the monitoring device on a display;
processing information and/or instructions associated with identifying possible persons of interest in connection with accessing biographic information regarding individuals located within the particular proximity; and
processing and/or providing information enabling depiction of the possible persons of interest along with one or both of the source location of the weapon fire and mobile device location for transmission in a manner suitable for graphical representation on a display.

12. The method of claim 11, wherein the at least one processing components communicates with at least one database containing lists of persons of interest, biographic information, information derived from a website, police information, terrorist information, known accomplice information, vehicle location information, shell or casings databases, person location information, and/or employee location information.

13. A method for processing information associated with weapon fire, the method comprising:
identifying a weapon fire incident;
determining a source location of the weapon fire;
processing positional information associated with a monitoring person or a monitored device within a particular proximity of the source location of the weapon fire;
processing display information for displaying both the location of the weapon fire and the monitoring device on a display;
processing information and/or instruction associated with identifying possible objects of interest in connection with accessing information regarding objects located within the particular proximity; and
processing and/or providing information enabling depiction of the possible objects of interest along with one or both of the source location of the weapon fire and mobile device location for transmission in a manner suitable for graphical representation on a display.

14. The method of claim 13, further comprising:
communicating with at least one databases containing one or more of government vehicle location information, blue force location information, automobile location information, individual information related to elderly and/or young persons, medical or humanitarian needs, biographic information, website information, police information, terrorist information, person location information, for those devices which are located proximately near a weapons fire incident.

15. A method for processing information associated with weapon fire, the method comprising:
identifying a weapon fire incident;
determining a source location of the weapon fire;
processing positional information associated with a monitoring person or a monitored device within a particular proximity of the source location of the weapon fire;
processing display information for displaying both the location of the weapon fire and the monitoring device on a display;
processing data for calculations made subsequent to the weapon fire incident including comparison of mobile device location information with weapon owner information associated with ballistic, ammunition or other weapon-related information obtained at the weapon fire incident location.

16. The method of claim 1 further comprising:
receiving mobile device communication data transmitted near in time to the weapon fire incident;
performing identification processing regarding identifying information associated with the mobile device.

17. The method of claim 16 further comprising:
providing harm-prevention information to individuals within a region near to the weapon fire location via transmission of warning information to communication devices located near the weapon fire location.

18. The method of claim 11 wherein the location of the monitoring device is obtained from a GPS location.

19. The method of claim 11 wherein the monitoring device is associated with or attached to a person of interest.

20. The method of claim 19 wherein the person of interest is an offender or a felon.

21. The method of claim 11 wherein the monitoring device location is obtained from a system associated with locating the device, wherein a related location determining process may use location-specific or perimeter intrusion methods.

22. The method of claim 21 wherein the monitoring device is with or attached to a person of interest such as an offender or felon.

23. The method of claim 11 wherein the device is a mobile phone, a cell phone, a Wi-fi device, or a land phone.

24. The method of claim 11 further comprising:
processing information related to enabling a computer or dispatcher to send a message to a device within a particular proximity of the weapon fire.

25. The method of claim 11 further comprising:
processing output information including weapon fire data and mobile device data configured to enable graphical representation of weapon fire location and device location on the display.

26. The method of claim 11 further comprising:
processing and/or providing motion data regarding movement of a mobile device after the weapon fire, wherein the motion data is provided for transmission in a manner suitable for graphical representation on a display.

27. The method of claim 11, further comprising:
communicating with at least one databases containing one or more of government vehicle location information, blue force location information, automobile location information, individual information related to elderly and/or young persons, medical or humanitarian needs, biographic information, website information, police information, terrorist information, person location information, for those devices which are located proximately near a weapons fire incident.

28. The method of claim 11 further comprising:
receiving mobile device communication data transmitted near in time to the weapon fire incident;
performing identification processing regarding identifying information associated with the mobile device.

29. The method of claim 13 wherein the location of the monitoring device is obtained from a GPS location.

30. The method of claim 29 further comprising:
providing harm-prevention information to individuals within a region near to the weapon fire location via transmission of warning information to communication devices located near the weapon fire location.

31. The method of claim 13 wherein the monitoring device is associated with or attached to a person of interest.

32. The method of claim 31 wherein the person of interest is an offender or a felon.

33. The method of claim 13 wherein the monitoring device location is obtained from a system associated with locating the device, wherein a related location determining process may use location-specific or perimeter intrusion methods.

34. The method of claim 33 wherein the monitoring device is with or attached to a person of interest such as an offender or felon.

35. The method of claim 13 wherein the device is a mobile phone, a cell phone, a Wi-fi device, or a land phone.

36. The method of claim 13 further comprising:
processing information related to enabling a computer or dispatcher to send a message to a device within a particular proximity of the weapon fire.

37. The method of claim 13 further comprising:
processing output information including weapon fire data and mobile device data configured to enable graphical representation of weapon fire location and device location on the display.

38. The method of claim 13 further comprising:
processing and/or providing motion data regarding movement of a mobile device after the weapon fire, wherein the motion data is provided for transmission in a manner suitable for graphical representation on a display.

39. The method of claim 13, further comprising:
communicating with at least one databases containing one or more of government vehicle location information, blue force location information, automobile location information, individual information related to elderly and/or young persons, medical or humanitarian needs, biographic information, website information, police information, terrorist information, person location information, for those devices which are located proximately near a weapons fire incident.

40. The method of claim 13 further comprising:
receiving mobile device communication data transmitted near in time to the weapon fire incident;
performing identification processing regarding identifying information associated with the mobile device.

41. The method of claim 40 further comprising:
providing harm-prevention information to individuals within a region near to the weapon fire location via transmission of warning information to communication devices located near the weapon fire location.

42. The method of claim 15 wherein the monitoring device is associated with or attached to a person of interest, and the location of the monitoring device is obtained from a GPS location.

43. The method of claim 42 wherein the person of interest is an offender or a felon.

44. The method of claim 15 wherein the monitoring device location is obtained from a system associated with locating the device, wherein a related location determining process may use location-specific or perimeter intrusion methods.

45. The method of claim 44 wherein the monitoring device is with or attached to a person of interest such as an offender or felon.

46. The method of claim 15 wherein the device is a mobile phone, a cell phone, a Wi-fi device, or a land phone.

47. The method of claim 15 further comprising:
processing and/or providing motion data regarding movement of a mobile device after the weapon fire, wherein the motion data is provided for transmission in a manner suitable for graphical representation on a display.

48. The method of claim 15, further comprising:
communicating with at least one databases containing one or more of government vehicle location information, blue force location information, automobile location information, individual information related to elderly and/or young persons, medical or humanitarian needs, biographic information, website information, police information, terrorist information, person location information, for those devices which are located proximately near a weapons fire incident.

49. The method of claim 15 further comprising:
receiving mobile device communication data transmitted near in time to the weapon fire incident;
performing identification processing regarding identifying information associated with the mobile device.

* * * * *